(12) United States Patent
Hirose et al.

(10) Patent No.: US 9,004,125 B2
(45) Date of Patent: Apr. 14, 2015

(54) PNEUMATIC TIRE

(75) Inventors: Katsumi Hirose, Hiratsuka (JP); Naoto Kaba, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 670 days.

(21) Appl. No.: 13/161,382

(22) Filed: Jun. 15, 2011

(65) Prior Publication Data

US 2011/0308679 A1 Dec. 22, 2011

(30) Foreign Application Priority Data

Jun. 18, 2010 (JP) ................................. 2010-139530

(51) Int. Cl.
*B60C 11/12* (2006.01)
*B60C 11/03* (2006.01)

(52) U.S. Cl.
CPC .............. *B60C 11/0304* (2013.04); *B60C 11/12* (2013.01); *B60C 2011/0365* (2013.04); *B60C 2011/0369* (2013.04); *B60C 2011/0372* (2013.04); *Y10S 152/03* (2013.01)

(58) Field of Classification Search
CPC ................ B60C 11/0304; B60C 11/12; B60C 2011/0365; B60C 2011/0369; B60C 2011/0372
USPC .................. 152/209.8, DIG. 3, 209.18, 209.1
IPC ........................................................ B60C 11/12
See application file for complete search history.

(56) References Cited

U.S. PATENT DOCUMENTS 3,581,794 A * 6/1971 Heuze et al. .................. 152/531
6,478,062 B1 * 11/2002 Schomburg .............. 152/209.15
2002/0011291 A1 * 1/2002 Ikeda .......................... 152/209.3
2005/0121123 A1 * 6/2005 Nakagawa .................. 152/209.9
2010/0078105 A1 * 4/2010 Hashimoto .............. 152/209.18

FOREIGN PATENT DOCUMENTS

| JP | 2000-025421 | | 1/2000 | |
|---|---|---|---|---|
| JP | 2004-345457 | | 12/2004 | |
| JP | 2005-170147 | | 6/2005 | |
| JP | 4107393 | * | 6/2008 | .............. B60C 11/03 |
| JP | 2010-006155 | | 1/2010 | |
| JP | 2010006155 A | * | 1/2010 | .............. B60C 11/04 |
| JP | 2010-058781 | | 3/2010 | |
| JP | 2010-132236 | | 6/2010 | |

OTHER PUBLICATIONS

Japanese Office Action; dated May 8, 2012; application 2010-139530, issuing Apr. 23, 2012.

* cited by examiner

*Primary Examiner* — Justin Fischer
*Assistant Examiner* — Philip N Schwartz
(74) *Attorney, Agent, or Firm* — Thorpe North & Western

(57) ABSTRACT

A pneumatic tire, wherein the central narrow groove includes an arc, the inner diameter side of the arc is facing towards the tire ground contact edge side, one end is open to another adjacent central narrow groove and the other end is open to the circumferential main groove on the inner side area side. A first central sipe is disposed between adjacent central narrow grooves, and connects the central narrow groove and the circumferential main groove on the inner side area side. One end of the notch portion is open to the circumferential main groove on the outer side area side, and the other end terminates within the central land portion. A second central sipe is disposed between adjacent notch portions. One end of the second central sipe is connected to the circumferential main groove on the outer side area side and another end terminates within the central land portion.

21 Claims, 8 Drawing Sheets

| | Conventional Example | Working Example 1 | Working Example 2 | Working Example 3 | Working Example 4 | Working Example 5 | Working Example 6 | Working Example 7 | Working Example 8 | Working Example 9 | Working Example 10 | Working Example 11 | Working Example 12 |
|---|---|---|---|---|---|---|---|---|---|---|---|---|---|
| Opening width d1 (mm) | 2.0 | 8.0 | 3.0 | 8.0 | 9.0 | 9.0 | 5.0 | 5.0 | 5.0 | 5.0 | 5.0 | 5.0 | 5.0 |
| Opening width d2 (mm) | 2.0 | 8.0 | 3.0 | 8.0 | 9.0 | 9.0 | 5.0 | 5.0 | 5.0 | 5.0 | 5.0 | 5.0 | 5.0 |
| Angle of inclination α (deg) | 90 | 60 | 60 | 60 | 80 | 70 | 60 | 60 | 60 | 60 | 60 | 60 | 60 |
| Opening width ratio d3:d4 | 1.0 | 2.0 | 2.0 | 2.0 | 2.0 | 1.5 | 3.0 | 2.0 | 2.0 | 2.0 | 2.0 | 2.0 | 2.0 |
| Narrow groove width d5 (mm) | - | 3.0 | 3.0 | 3.0 | 3.0 | 3.0 | 3.0 | 1.5 | 4.0 | 3.0 | 3.0 | 3.0 | 3.0 |
| Opening width ratio d6:d7 | - | 2 | 2 | 2 | 2 | 1.5 | 1.5 | 2 | 2 | 2 | 2 | 2 | 2 |
| Angle of inclination β (deg) | 90 | 65 | 65 | 65 | 65 | 65 | 65 | 65 | 65 | 55 | 75 | 65 | 65 |
| R/SH | 1.6 | 1.6 | 1.6 | 1.6 | 1.6 | 1.6 | 1.6 | 1.6 | 1.6 | 1.6 | 1.8 | 1.5 | 1.7 |
| Dry performance | 100 | 105 | 107 | 103 | 103 | 106 | 107 | 104 | 105 | 105 | 105 | 105 | 105 |
| Snow performance | 100 | 105 | 103 | 107 | 104 | 104 | 103 | 103 | 105 | 103 | 107 | 105 | 105 |
| Vehicle external noise performance | 100 | 105 | 107 | 105 | 105 | 105 | 105 | 105 | 105 | 105 | 104 | 105 | 105 |
| Vehicle internal noise performance | 100 | 105 | 107 | 105 | 105 | 105 | 105 | 105 | 105 | 105 | 104 | 103 | 107 |

FIG. 10

PNEUMATIC TIRE

PRIORITY CLAIM

Priority is claimed to Japan Patent Application Serial No. 2010-139530 filed on Jun. 18, 2010.

BACKGROUND

1. Technical Field

The present technology relates to a pneumatic tire, and more particularly relates to a pneumatic tire that has both dry performance and snow performance.

2. Related Art

In recent years there has been a demand for pneumatic tires for passenger vehicles that have both dry performance (e.g., forward traveling performance, turnability, and steering stability performance on dry road surfaces) and snow performance (e.g., traction performance on a snowy road surfaces), which are mutually conflicting aspects of performance. A conventional pneumatic tire that satisfies the above demand is described in Japanese Unexamined Patent Application Publication No. 2004-345457.

Also, a tire tread pattern is known in which a land portion (center land portion) on the equator of the tire has arc-shaped narrow grooves that are in communication with each other while being continuously disposed in the tire circumferential direction in a region (inner side region) on the inner side in the vehicle width direction when the tire is mounted on the vehicle, and notched portions in a region (outer side region) on the outer side in the vehicle width direction. The technology described in Japanese Unexamined Patent Application Publication No. 2010-58781A is a conventional pneumatic tire using such construction.

SUMMARY

The present technology provides a pneumatic tire that has both dry performance and snow performance. In order to achieve the technology, a pneumatic tire has a plurality of circumferential main grooves extending in a tire circumferential direction and a plurality of land portions formed by being partitioned by the circumferential main grooves. Areas on left and right sides of the tread portion, with the tire equator as a boundary, are referred to as an inner side area and an outer side area respectively. The pneumatic tire described above includes a central land portion located on the tire equator including a central narrow groove and a first central sipe located in the inner side area, and a notch portion and a second central sipe located in the outer side area. The central narrow groove has a arc shape, and an inner diameter side of the arc shape faces towards a tire ground contact edge side. One end of the central narrow groove is open to another adjacent central narrow groove and another end thereof is open to the circumferential main groove on the inner side area side. The first central sipe is disposed between the adjacent central narrow grooves and connects the central narrow groove and the circumferential main groove on the inner side area side. One end of the notch portion is open to the circumferential main groove on the outer side area side and another end thereof terminates within the central land portion. The second central sipe is disposed between adjacent notch portions, and one end of the second central sipe is connected to the circumferential main groove on the outer side area side and another end thereof terminates within the central land portion.

In this pneumatic tire, the central narrow groove, the first central sipe, the notch portion, and the second central sipe are disposed on the inner side area and the outer side area in the vehicle width direction, so an edge component of the central land portion is increased, and the tire snow performance (traction performance) is enhanced. On the other hand, in the outer side area in the width direction of the vehicle, which has a great effect on the tire forward traveling performance, the notch portion and the second central sipe have a semi-closed structure, so a rib-shaped structure is maintained, and the tire dry performance (forward traveling performance) is enhanced. Such a configuration is advantageous in that both tire dry performance and snow performance are achieved.

Also, in the pneumatic tire according to the technology, an opening width d1 of the central narrow groove with respect to the circumferential main groove is within the range 3 (mm) ≤d1≤8 (mm), and a groove width of the central narrow groove decreases from the opening with respect to the circumferential main groove towards a connection portion with the adjacent central narrow groove.

In this pneumatic tire, the dimensions and shape of the central narrow groove are optimized, and this is advantageous in that both the tire dry performance and snow performance are optimally achieved.

Also, in the pneumatic tire according to the technology, an opening width d2 of the notch portion with respect to the circumferential main groove is within the range 3 (mm)≤d2≤8 (mm).

In this pneumatic tire, the dimensions and shape of the notch portion are optimized, and this is advantageous in that both the tire dry performance and snow performance are optimally achieved.

Also, in the pneumatic tire according to the technology, an angle of inclination α of the notch portion with respect to the tire circumferential direction is within the range 50 (deg) ≤α≤75 (deg).

In this pneumatic tire, the angle of inclination α of the notch portion is optimized, and this is advantageous in that the tire traction performance and noise performance are ensured.

Also, the pneumatic tire according to the technology includes an inner side second land portion on the inner side area side of the central land portion. The inner side second land portion includes an inner side second lug groove that crosses the inner side second land portion and has an opening width with respect to the circumferential main groove on the tire ground contact edge side that is larger than an opening width with respect to the circumferential main groove on the tire equator side; an inner side second narrow groove that connects adjacent inner side second lug grooves; a first inner side second sipe that connects the inner side second narrow groove and the circumferential main groove on the tire ground contact edge side; and a second inner side second sipe that connects the inner side second narrow groove and the circumferential main groove on the tire equator side.

In this pneumatic tire, the inner side second land portion includes the inner side second lug groove, the inner side second narrow groove, a pair of sipes (the first inner side second sipe and the second inner side second sipe). Therefore, the edge component of the land portion is increased, and the tire traction performance is enhanced. Here, in the inner side second lug groove, the opening width with respect to the circumferential main groove on the tire ground contact edge side is larger than the opening width with respect to the circumferential main groove on the tire equator side. Therefore, the rigidity of the edge portion on the tire equator side is increased, and the tire dry performance (forward traveling performance) is ensured. Such a configuration is advantageous in that both tire dry performance and snow performance are achieved.

Also, the pneumatic tire according to the technology has a plurality of circumferential main grooves extending in a tire circumferential direction and a plurality of land portions formed by being partitioned by the circumferential main grooves. Areas on left and right sides of the tread portion, with the tire equator as a boundary, are referred to as an inner side area and an outer side area respectively. The pneumatic tire described above includes a central land portion on the tire equator, an inner side second land portion disposed adjacent to the central land portion on the inner side area, and an outer side second land portion disposed adjacent to the central land portion on the outer side area. The inner side second land portion includes an inner side second lug groove that crosses the inner side second land portion and has an opening width with respect to the circumferential main groove on the tire ground contact edge side that is larger than an opening width with respect to the circumferential main groove on the tire equator side; an inner side second narrow groove that connects adjacent inner side second lug grooves; a first inner side second sipe that connects the inner side second narrow groove and the circumferential main groove on the tire ground contact edge side; and a second inner side second sipe that connects the inner side second narrow groove and the circumferential main groove on the tire equator side. A groove area of the outer side second land portion is set smaller than a groove area of the inner side second land portion.

In this pneumatic tire, the inner side second land portion and the outer side second land portion have grooves and sipes. Therefore, the edge component of the land portions is increased, and the tire traction performance is enhanced. On the other hand, the groove area of the outer side second land portion is set smaller than the groove area of the inner side second land portion. Therefore, the rigidity of the outer side second land portion which has a large effect on the tire forward traveling performance is maintained, and the tire dry performance is ensured. Such a configuration is advantageous in that both tire dry performance and snow performance are achieved.

Also, in the pneumatic tire according to the technology, an opening width d3 of the inner side second lug groove with respect to the circumferential main groove on the tire ground contact edge side and an opening width d4 with respect to the circumferential main groove on the tire equator side have a relationship $1.5 \leq d3/d4 \leq 2.0$.

In this pneumatic tire, the ratio d3/d4 of the opening widths d3 to d4 on the left and right sides of the inner side second lug groove is optimized. Therefore, the rigidity of the edge portion on the tire equator side (the outer side in the vehicle width direction when the tire is mounted on the vehicle) is effectively increased, leading to the advantage of the tire dry performance (forward traveling performance) being ensured.

Also, in the pneumatic tire according to the technology, a groove width d5 of the inner side second narrow groove is within the range $1.5 \text{ (mm)} \leq d5 \leq 4.0 \text{ (mm)}$.

In the pneumatic tire the groove width d5 of the inner side second narrow groove is optimized. This is advantageous in that the tire dry performance and snow performance are both achieved.

Also, the pneumatic tire according to the technology includes an outer side shoulder land portion disposed in the shoulder portion of the outer side area. The outer side shoulder land portion includes an outer side shoulder lug groove having one end that is open to the outer side in the tire width direction and another end that terminates within the land portion, and an outer side shoulder sipe that connects the terminating portion of one outer side shoulder lug groove of adjacent outer side shoulder lug grooves to a center of another outer side shoulder lug groove.

In the pneumatic tire, the outer side shoulder lug groove has a non-penetrating structure (a structure that terminates within the land portion). Therefore, rigidity of the land portion on the outer side area side, which greatly affects the tire steering stability performance (turnability) is ensured, leading to the advantage of the tire dry performance being ensured. On the other hand, the outer side shoulder sipe connects adjacent outer side shoulder lug grooves. Therefore, the tire traction performance (snow performance) is increased. Such a configuration is advantageous in that both tire dry performance and snow performance are achieved.

Also, the pneumatic tire according to the technology has a plurality of circumferential main grooves extending in the tire circumferential direction and a plurality of land portions formed by being partitioned by the circumferential main grooves. The areas on the left and right sides of the tread portion, with the tire equator as a boundary, are referred to as an inner side area and an outer side area respectively. The pneumatic tire described above includes a central land portion disposed on the tire equator, an outer side shoulder land portion disposed in a shoulder portion of the outer side area, and an inner side shoulder land portion disposed in a shoulder portion of the inner side area. The outer side shoulder land portion includes an outer side shoulder lug groove having one end that is open to the outer side in the tire width direction and another end that terminates within the outer side shoulder land portion, and an outer side shoulder sipe that connects the terminating portion of one outer side shoulder lug groove of adjacent outer side shoulder lug grooves to a center of another outer side shoulder lug groove. The outer side shoulder land portion has a groove area smaller than that of the inner side shoulder land portion.

In this pneumatic tire, the outer side shoulder lug groove has a non-penetrating structure (a structure terminating within the land portion) and the outer side shoulder sipe connects adjacent outer side shoulder lug grooves. Such a configuration is advantageous in that both tire dry performance and snow performance are achieved. In addition, the outer side shoulder land portion has a groove area smaller than that of the inner side shoulder land portion. Therefore, the rigidity of the outer side shoulder land portion, which greatly affects the tire turnability, is ensured, leading to the advantage of the tire dry performance being properly ensured.

Also, in the pneumatic tire according to the technology, the outer side shoulder land portion has a recess in the edge portion on the inner side in the tire width direction.

In this pneumatic tire, the recess reduces the rigidity of the outer side shoulder land portion, leading to the advantage of the tire traction performance being enhanced.

Also, the pneumatic tire according to the technology includes an outer side second land portion disposed in the outer side area, and adjacent to the central land portion. The outer side second land portion includes an outer side second lug groove that crosses the outer side second land portion while inclined with respect to the tire circumferential direction and has an opening width with respect to the circumferential main groove on the tire ground contact edge side that is larger than an opening width with respect to the circumferential main groove on the tire equator side; and an outer side second sipe that crosses the outer side second land portion while inclined in a direction opposite that of the outer side second lug groove.

In this pneumatic tire, the outer side second land portion includes the outer side second lug groove and the outer side second sipe. Therefore, the tire traction performance is enhanced. Also, the outer side second lug groove and the outer side second sipe are inclined in opposite directions. Therefore, the tire traction performance is further increased. On the other hand, in the outer side second lug groove, the opening width with respect to the circumferential main groove on the tire ground contact edge side is larger than the opening width with respect to the circumferential main groove on the tire equator side. Therefore, the rigidity of the edge portion on the tire ground contact edge side, which has a great effect on the tire forward traveling performance, is increased, and the tire dry performance is ensured. Such configurations are advantageous in that both tire dry performance and snow performance are achieved.

Also, in the pneumatic tire according to the technology, an opening width d6 of the outer side second lug groove with respect to the circumferential main groove on the tire ground contact edge side and an opening width d7 with respect to the circumferential main groove on the tire equator side have the relationship $1.5 \leq d6/d7 \leq 2.0$.

In this pneumatic tire, the ratio d6/d7 of the opening width d6 to the opening width d7 on the left and right sides of the outer side second lug groove is optimized. Therefore, the rigidity of the edge portion on the tire ground contact edge side (the outer side in the vehicle width direction when the tire is mounted on the vehicle) is effectively increased, leading to the advantage of the tire dry performance (steering stability performance) being ensured.

Also, in the pneumatic tire according to the technology, an angle of inclination β of the outer side second lug groove with respect to the tire circumferential direction is within the range $55 \text{ (deg)} \leq \beta \leq 75 \text{ (deg)}$.

In this pneumatic tire, the angle of inclination β of the outer side second lug groove is optimized, leading to the advantage of the tire traction performance and noise performance being ensured.

Also, the pneumatic tire according to the technology includes an inner side shoulder land portion disposed in the shoulder portion of the inner side area. The inner side shoulder land portion includes an inner side shoulder lug groove that crosses the inner side shoulder land portion and has an opening width on the outer side in the tire width direction that is larger than an opening width with respect to the circumferential main groove on the inner side in the tire width direction. The inner side shoulder land portion also includes an auxiliary sipe disposed between adjacent inner side shoulder lug grooves and that connects to the circumferential main groove on the inner side in the tire width direction.

In this pneumatic tire, the inner side shoulder land portion includes the inner side shoulder lug groove and the auxiliary sipe, leading to the advantage of the tire traction performance being enhanced. On the other hand, the relationship between the opening widths and on the left and right sides of the inner side shoulder lug groove is set so that the opening width narrows on the inner side in the tire width direction, leading to the advantage of the tire noise performance being ensured.

In the pneumatic tire according to the technology, in an inflated state, a curvature radius R of the tire tread portion and an external tire diameter SH have the relationship $1.5 \leq R/SH \leq 1.7$.

In this pneumatic tire, by optimizing the ratio R/SH of the curvature radius R of the tire tread portion to the external tire diameter SH when inflated, the tire ground contact shape is optimized. Thus, high frequency pattern noise generated when the tire is rotating is suppressed, leading to the advantage of the tire noise performance being enhanced.

With the pneumatic tire according to the present technology, the central narrow groove, the first central sipe, the notch portion, and the second central sipe are disposed on the inner side area and the outer side area in the vehicle width direction, so an edge component of the central land portion is increased, and the tire snow performance (traction performance) is enhanced. On the other hand, in the outer side area in the width direction of the vehicle, which has a great effect on the tire forward traveling performance, the notch portion and the second central sipe have a semi-closed structure, so a rib-shaped structure is maintained, and the tire dry performance (forward traveling performance) is enhanced. Such a configuration is advantageous in that both tire dry performance and snow performance are achieved.

Also, with the pneumatic tire according to the present technology, the inner side second land portion and the outer side second land portion have grooves and sipes. Therefore, the edge component of the land portions is increased, and the tire traction performance is enhanced. On the other hand, the groove area of the outer side second land portion is set smaller than the groove area of the inner side second land portion. Therefore, the rigidity of the outer side second land portion which has a large effect on the tire forward traveling performance is maintained, and the tire dry performance is ensured. Such a configuration is advantageous in that both tire dry performance and snow performance are achieved.

Also, with the pneumatic tire according to the present technology, the outer side shoulder lug groove has a non-penetrating structure (a structure terminating within the land portion) and the outer side shoulder sipe connects adjacent outer side shoulder lug grooves. Such a configuration is advantageous in that both tire dry performance and snow performance are achieved. In addition, the outer side shoulder land portion has a groove area smaller than that of the inner side shoulder land portion. Therefore, the rigidity of the outer side shoulder land portion, which greatly affects the tire turnability, is ensured, leading to the advantage of the tire dry performance being properly ensured.

BRIEF DESCRIPTION OF THE DRAWINGS

FIG. 10 is a table showing the results of performance testing of pneumatic tires according to working examples of the present technology.

DETAILED DESCRIPTION

The present technology is explained in detail below with reference to the accompanying drawing. However, the present technology is not limited to this embodiment. Moreover, constituents of the embodiment which can possibly or obviously be substituted while maintaining consistency with the present technology are included. Furthermore, the multiple modified examples described in the embodiment can be combined as desired within the scope apparent to a person skilled in the art.

Pneumatic Tire

Figure 1:
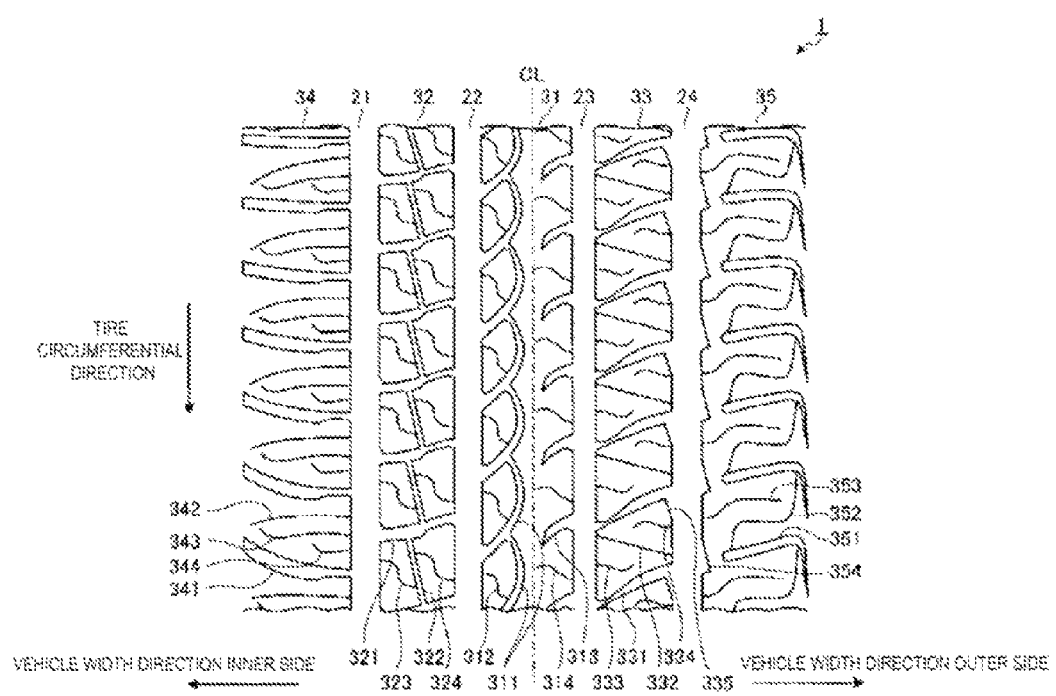
FIG. 1 is a plan view illustrating a tread pattern of a pneumatic tire according to an embodiment of the present technology.

FIG. 1 is a plan view showing a tread pattern of a pneumatic tire according to an embodiment of the technology.

This pneumatic tire 1 is a tire for a passenger car, and the mounting direction of the tire on the car is stipulated. In this embodiment, when the tire is in the mounted state on the car, the area on the inner side in the width direction of the car is referred to as the inner side area, and the area on the outer side in the width direction of the car is referred to as the outer side area. The tire mounting direction is normally stated on the tire side wall portion.

The pneumatic tire 1 has a plurality of circumferential main grooves 21 through 24, extending in the circumferential direction of the tire, and a plurality of land portions 31 through 35, partitioned and formed by the circumferential main grooves 21 through 24. For example, in this embodiment, two circumferential main grooves 21, 22 are disposed in the area on the inner side in the vehicle width direction, with the tire equator CL as the boundary, and two circumferential main grooves 23, 24 are disposed in the area on the outer side in the vehicle width direction. Five rib-shaped land portions 31 through 35 are partitioned by the circumferential main grooves 21 through 24. Of these land portions 31 through 35, the land portion on the tire equator CL is referred to as "central land portion 31", the land portions adjacent to the central land portion 31 are referred to as "inner side second land portion 32" and "outer side second land portion 33", and the land portions adjacent to the second land portions 32 and 33 on the outer side in the width direction are referred to as "inner side shoulder land portion 34" and "outer side shoulder land portion 35". In this way, a rib-based tread pattern is formed.

In the pneumatic tire 1, the following asymmetric tread pattern is adopted in order to obtain both dry performance of the tire (e.g., forward traveling performance, turnability, and steering performance on dry road surfaces) and snow performance (e.g., traction performance on a snowy road surfaces), which are mutually conflicting aspects of performance.

Central Land Portion

Figure 2:
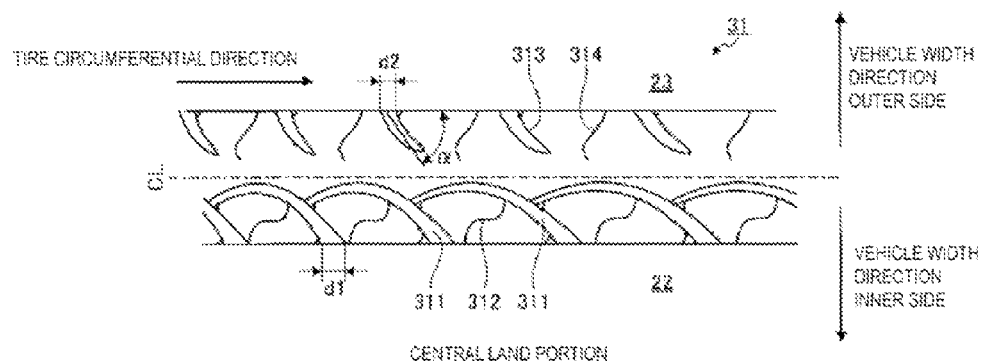
FIG. 2 is a plan view illustrating the central land portion of the pneumatic tire illustrated in FIG. 1.

FIG. 2 is a plan view illustrating the central land portion of the pneumatic tire illustrated in FIG. 1.

The central land portion 31 is on the tire equator CL, and is partitioned by the circumferential main grooves 22, 23 on the left and right sides. The central land portion 31 has a unit pattern formed from a central narrow groove 311 and a first central sipe 312 disposed in the inner side area in the vehicle width direction, and a notch portion 313 and a second central sipe 314 disposed in the outer side area. This unit pattern is continuously disposed in the tire circumferential direction.

The central narrow groove 311 has a gentle arc shape, and the inner diameter side of the arc shape is disposed towards the tire ground contact edge side (convex towards the tire equator CL). Also, one end of the central narrow groove 311 opens to the adjacent central narrow groove 311, and at the other end opens to the circumferential main groove 22 on the inner side area side. Also, a plurality of the central narrow grooves 311 is disposed mutually linked together continuously in the tire circumferential direction. Thus, a plurality of block-shaped land portions is disposed in series in the tire circumferential direction along the circumferential main groove 22 in the inner side area of the central land portion 31. The traction performance (snow performance) of the tire is enhanced by these block-shaped land portions.

In this embodiment, a chamfering process is performed on connection portions of adjacent central narrow grooves 311, 311. Thus, damage to the rubber material at the connection portions is suppressed.

The first central sipe 312 is disposed between adjacent central narrow grooves 311, 311, and is an open sipe that connects the central narrow groove 311 and the circumferential main groove 22 on the inner side area side. For example, in this embodiment, the land portion is partitioned into fan-shaped block portions by the adjacent arc-shaped central narrow grooves 311, 311 along the circumferential main groove 22, and the first central sipe 312 is disposed within these block portions. Also, the first central sipe 312 extends from the center of the central narrow groove 311 in the radial direction (center direction) of the arc shape of the central narrow groove 311 and reaches to the circumferential main groove 22 on the inner side area side, therefore dividing the block portion again into two fan shapes. Also, the first central sipe 312 and the central narrow groove 311 are inclined in mutually different directions with respect to the tire circumferential direction (forming an upside-down "V" shape), and are open to the circumferential main groove 22. Thus, the traction performance (snow performance) of the tire is enhanced.

In this embodiment, the first central sipe 312 has an S-shape. Therefore, by dividing the land portion that is partitioned by the adjacent central narrow grooves 311, 311 with the first central sipe 312, the traction performance of the central land portion 31 is increased. Additionally, by providing the first central sipe 312 with an S-shape, the rigidity of the central land portion 31 is ensured.

The notch portion 313 is inclined with respect to the tire circumferential direction and has one end that is open to the circumferential main groove 23 on the outer side area side, and another end that terminates within the outer side area of the central land portion 31. Thus, the notch portion 313 has a semi-closed structure. By providing this notch portion 313, the edge component of the land portion is increased, and the tire traction performance (snow performance) is enhanced. Additionally, by providing the notch portion 313 with a semi-closed structure, the rigidity of the edge portions of the land portion is ensured, and the dry performance of the tire is ensured.

The second central sipe 314 is disposed between the adjacent notch portions 313, 313, one end of the second central sipe 314 reaches to the circumferential main groove 23 on the outer side area side, and the other end terminates within the outer side area of the central land portion 31, thus forming a semi-closed sipe. For example, in this embodiment, the second central sipe 314 is connected to only the circumferential main groove 23 on the outer side area side. As a result of the semi-closed structure, the rigidity of the tire is ensured, and the dry performance of the tire is ensured. Also, the second central sipe 314 reaches the circumferential main groove 23 while inclined with respect to the tire circumferential direction in the opposite direction to the notch portion 313 (forming an upside-down "V" shape). In this way the traction performance (snow performance) of the tire is enhanced.

As described above, in the pneumatic tire 1, the central narrow groove 311 has a arc shape, the inner diameter side of the arc shape is facing towards the tire ground contact edge side, one end is open to the other adjacent central narrow groove 311 and the other end is open to the circumferential main groove 22 on the inner side area side (see FIGS. 1 and 2).

Also, the first central sipe 312 is disposed between adjacent central narrow grooves 311, 311, and has an open structure that connects the central narrow groove 311 and the circumferential main groove 22 on the inner side area side. One end of the notch portion 313 is open to the circumferential main groove 23 on the outer side area side, and at the other end terminates within the central land portion 31. Thus, the notch portion 313 has a semi-closed structure. Also, the second central sipe 314 is disposed between adjacent notch portions 313, 313. One end of the second central sipe 314 is connected to the circumferential main groove 23 on the outer side area side, and the other end terminates within the central land portion 31, forming a semi-closed sipe.

In this configuration, the central narrow groove 311, the first central sipe 312, the notch portion 313, and the second central sipe 314 are disposed in the inner side area and the outer side area in the vehicle width direction. Therefore, the edge component of the central land portion 31 is increased, and the tire snow performance (traction performance) is enhanced. Additionally, in the outer side area in the vehicle width direction, which has a great effect on the tire forward traveling performance, the notch portion 313 and the second central sipe 314 have semi-closed structures. Therefore, the rib-shaped structure is maintained, and the tire dry performance (forward traveling performance) is enhanced. Such a configuration is advantageous in that both tire dry performance and snow performance are achieved.

Also, in this configuration, the central land portion 31 includes the first central sipe 312 and the second central sipe 314, leading to the tire traction performance being enhanced. Additionally, because the sipes 312, 314 are not narrow grooves, the tire dry performance is ensured, and the tire noise performance (vehicle external noise performance and pattern noise performance) is improved. For example, if these sipes were narrow grooves, the rigidity of the land portion would decline, the tire traveling performance would be reduced, and when the wheels rotated the percussion sound caused by the grooves would be significant and noise would increase.

Also, in the pneumatic tire 1, the first central sipe 312 extends from the center of the central narrow groove 311 in the radial direction of the arc shape of the central narrow groove 311 (see FIGS. 1 and 2). In this configuration, the first central sipe 312 and the central narrow groove 311 reach the circumferential main groove 22 while inclining in mutually different directions with respect to the tire circumferential direction (forming an upside-down "V" shape). This leads to the advantage of the tire traction performance (snow performance) being enhanced.

Also, in the pneumatic tire 1, the notch portion 313 is inclined with respect to the tire circumferential direction, and the second central sipe 314 arrives at the circumferential main groove 23 inclined in a direction opposite the notch portion 313 with respect to the tire circumferential direction (forming an upside-down "V" shape; see FIGS. 1 and 2). This configuration is advantageous in that the tire traction performance (snow performance) is enhanced over that of a configuration in which the notch portions and the sipes are inclined in the same direction.

Also, in the pneumatic tire 1, the opening width d1 of the central narrow groove 311 with respect to the circumferential main groove 22 is within the range 3 (mm)≤d1≤8 (mm), and the groove width of the central narrow groove 311 declines from the opening with respect to the circumferential main groove 22 toward the connection portion with the adjacent central narrow groove 311 (see FIG. 2). In this configuration, the dimensions and shape of the central narrow groove 311 are optimized, and this is advantageous in that both the tire dry performance and snow performance are optimally achieved. For example, if d1<3 (mm), the rigidity of the central land portion will increase and the traction performance cannot be ensured, so this is not desirable. Also, if 8 (mm)<d1, the rigidity of the central land portion will decrease and the steering stability performance will decrease, so this is not desirable.

In this embodiment, the groove width (e.g., the opening width d1 of the central narrow groove 311) is measured under conditions where the tire is assembled on a prescribed rim, inflated with a prescribed internal pressure, and loaded with a prescribed load.

Herein, "prescribed rim" refers to an "application rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). Also, "prescribed internal pressure" refers to the "highest air pressure" defined by JATMA, the maximum value of "tire load limits at various cold inflation pressures" defined by TRA, or "inflation pressures" defined by ETRTO. Moreover, "prescribed load" refers to "maximum load capacity" defined by JATMA, the maximum value in "tire load limits at various cold inflation pressures" defined by TRA, or "load capacity" defined by ETRTO. However, in the case of passenger car tires, the prescribed internal pressure is an air pressure of 180 kPa, and the prescribed load is 88% of the maximum load capacity.

Also, in the pneumatic tire 1, the opening width d2 of the notch portion 313 with respect to the circumferential main groove 23 is preferably within the range 3 (mm)≤d2≤8 (mm) (see FIG. 2). In this configuration, the dimensions and shape of the notch portion 313 are optimized, and this has the advantage that both the tire dry performance and snow performance are optimally achieved. For example, if d2<3 (mm), the rigidity of the central land portion will increase and the traction performance cannot be ensured, so this is not desirable. Also, if 8 (mm)<d2, the rigidity of the central land portion will decrease and the steering stability performance will decrease, so this is not desirable.

Also, in the pneumatic tire 1, the angle of inclination α of the notch portion 313 with respect to the tire circumferential direction is preferably in the range 50 (deg)≤α≤75 (deg) (see FIG. 2). In this configuration, the angle of inclination α of the notch portion 313 is optimized, and this is advantageous in that the tire traction performance and noise performance are ensured. For example, if α<50 (deg), the rigidity of the central land portion will increase and the traction performance cannot be ensured, so this is not desirable. Also, if 75 (deg)<α, the rigidity of the central land portion will decrease and the steering stability performance will decrease, so this is not desirable.

The angle of inclination α of the notch portion 313 is measured using a straight line passing through a center point of the opening of the notch portion 313 and through a center point of the width of the notch at a center point in the longitudinal direction of the notch portion 313 as a line of reference.

Inner Side Second Land Portion

Figure 3:
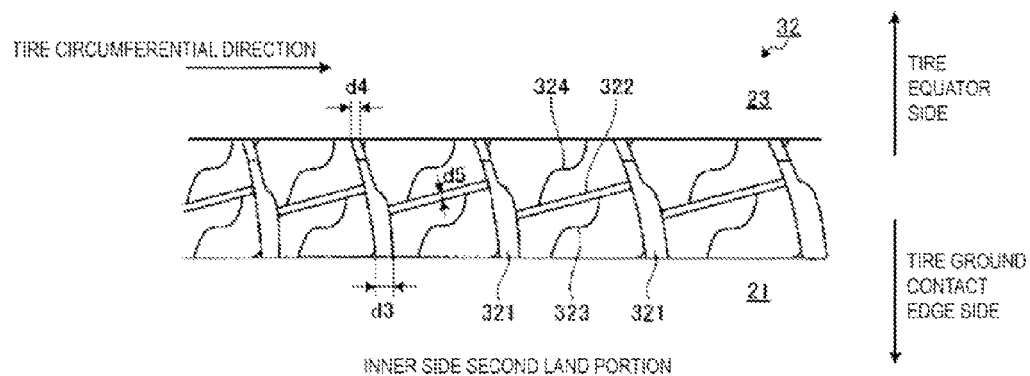
FIG. 3 is a plan view illustrating the inner side second land portion of the pneumatic tire illustrated in FIG. 1.

FIG. 3 is a plan view illustrating the inner side second land portion of the pneumatic tire illustrated in FIG. 1.

The inner side second land portion 32 is disposed on the inner side area side of the tread portion with respect to the central land portion 31. For example, in this embodiment, the central land portion 31 and the inner side second land portion 32 are adjacent to each other and sandwich the circumferential main groove 22. The inner side second land portion 32 includes a unit pattern formed from an inner side second lug groove 321, an inner side second narrow groove 322, and a pair of sipes (a first inner side second sipe 323 and a second inner side second sipe 324), and has a structure in which this unit pattern is continuously disposed along the tire circumferential direction.

The inner side second lug groove 321 crosses the inner side second land portion 32 in the tire width direction, and is open to the circumferential main grooves 21, 22 on the left and right sides of the inner side second land portion 32. In the inner side second lug groove 321, the opening width d3 with respect to the circumferential main groove 21 on the tire ground contact edge side is greater than the opening width d4 with respect to the circumferential main groove 22 on the tire equator CL side (d3>d4). For example, in this embodiment, the inner side second lug groove 321 has either a linear shape or a gentle arc shape, and is disposed with a gentle inclination with respect to the tire width direction. Also, the inner side second lug groove 321 has a shape in which the groove width widens step-like at the center of the inner side second land portion 32. Also, the groove depth of the portion with the wide opening width d3 is set so as to be greater than the groove depth of the portion with the narrow opening width d4. Therefore, a difference in rigidity is provided between the left and right sides of the land portion.

The inner side second narrow groove 322 is a narrow groove that connects adjacent inner side second lug grooves 321, 321. For example, in this embodiment, the inner side second narrow groove 322 has a linear shape and connects the centers of adjacent inner side second lug grooves 321, 321. Also, the inner side second narrow groove 322 is inclined with respect to the tire circumferential direction. Therefore, adjacent inner side second narrow grooves 322, 322 open at different positions on a common inner side second lug groove 321.

The first inner side second sipe 323 is an open sipe that connects the inner side second narrow groove 322 and the circumferential main groove 21 on the tire ground contact edge side. For example, in this embodiment, the first inner side second sipe 323 has a rough S-shape, and meanders from the center of the inner side second narrow groove 322 extending in the tire width direction and connects with the circumferential main groove 21 on the tire ground contact edge side. Also, the first inner side second sipe 323 reaches the circumferential main groove 21 inclined in the opposite direction with respect to the inner side second lug groove 321 (forming an upside-down "V" shape).

The second inner side second sipe 324 is an open sipe that connects the inner side second narrow groove 322 and the circumferential main groove 22 on the tire equator CL side. For example, in this embodiment, the second inner side second sipe 324 has a rough S-shape, and meanders from the center of the inner side second narrow groove 322 extending in the tire width direction and connects with the circumferential main groove 22 on the tire equator CL side. Also, the second inner side second sipe 324 reaches the circumferential main groove 22 inclined in the opposite direction with respect to the inner side second lug groove 321 (forming an upside-down "V" shape).

As described above, in the pneumatic tire 1, the inner side second land portion 32 includes the inner side second lug groove 321 that crosses the inner side second land portion 32, and has an opening width d3 with respect to the circumferential main groove 21 on the tire ground contact edge side that is greater than the opening width d4 with respect to the circumferential main groove 22 on the tire equator CL side; the inner side second narrow groove 322 that connects adjacent inner side second lug grooves 321, 321; the first inner side second sipe 323 that connects the inner side second narrow groove 322 and the circumferential main groove 21 on the tire ground contact edge side; and the second inner side second sipe 324 that connects the inner side second narrow groove 322 and the circumferential main groove 22 on the tire equator CL side (see FIGS. 1 and 3). In this configuration, the inner side second land portion 32 includes the inner side second lug groove 321, the inner side second narrow groove 322, and a pair of sipes (the first inner side second sipe 323 and the second inner side second sipe 324). Therefore, the edge component of the land portion is increased, and the tire traction performance is enhanced. Here, in the inner side second lug groove 321, the opening width d3 with respect to the circumferential main groove 21 on the tire ground contact edge side is larger than the opening width d4 with respect to the circumferential main groove 22 on the tire equator CL side. Therefore, the rigidity of the edge portion on the tire equator CL side is increased, and the tire dry performance (forward traveling performance) is ensured. Such a configuration is advantageous in that both tire dry performance and snow performance are achieved.

Also, in the pneumatic tire 1, the groove area (total area of grooves and sipes) of the outer side second land portion 33 is set to be smaller than the groove area of the inner side second land portion 32 (see FIG. 1). In this configuration, the inner side second land portion 32 and the outer side second land portion 33 have grooves and sipes, leading to the edge component of the land portions being increased, and the tire traction performance being enhanced. Additionally, the groove area of the outer side second land portion 33 is set to be smaller than the groove area of the inner side second land portion 32, so the rigidity of the outer side second land portion 33, which has a large effect on the tire forward traveling performance, is maintained and the tire dry performance is ensured. Such a configuration is advantageous in that both tire dry performance and snow performance are achieved.

In particular, in the above configuration where the central land portion 31 is combined with the inner side second land portion 32, the central land portion 31 ensures the tire forward traveling performance while the inner side second land portion 32 enhances the tire traction performance, leading to the advantage of the tire dry performance and the snow performance both being more optimally achieved.

Also, in the pneumatic tire 1, the opening width d3 with respect to the circumferential main groove 21 on the tire ground contact edge side of the inner side second lug groove 321 and the opening width d4 with respect to the circumferential main groove 22 on the tire equator CL side preferably have the relationship $1.5 \leq d3/d4 \leq 2.0$ (see FIG. 3). In this configuration, the ratio d3/d4 of the opening widths d3, d4 on the left and right sides of the inner side second lug groove 321 is optimized. Therefore, the rigidity of the edge portion on the tire equator CL side (the outer side in the vehicle width direction when the tire is mounted on the vehicle) is effectively increased, leading to the advantage of the tire dry performance (forward traveling performance) being ensured.

Also, in the pneumatic tire 1, adjacent inner side second narrow grooves 322, 322 are preferably open at different positions with respect to the common inner side second lug groove 321 (see FIG. 3). For example, in this embodiment, the inner side second lug groove 321 is inclined with respect to the tire width direction and opens to the left and right side circumferential main grooves 21, 22. The adjacent inner side second narrow grooves 322, 322 each open to this inner side second lug groove 321. Here, the adjacent inner side second narrow grooves 322, 322 are inclined with respect to the tire circumferential direction, and open to the inner side second lug groove 321 at different positions. In this configuration, the inner side second land portion 32 is divided by the inner side second lug groove 321 and the inner side second narrow groove 322, forming block-shaped land portions arranged in a zigzag shape in the tire circumferential direction. Thus, when the tire rotates, these divided portions successively contact the ground and deform independently, leading to the traction performance of the inner side second land portion 32 being enhanced. This leads to the advantage of the tire snow performance being enhanced.

Also, in the pneumatic tire 1, preferably the inner side second lug groove 321 is inclined with respect to the tire width direction, and the first inner side second sipe 323 and/or the second inner side second sipe 324 reach the circumferential main grooves 21, 22 inclined in the direction opposite that of the inner side second lug groove 321 (forming an upside-down "V" shape; see FIG. 3). For example, in this embodiment, the inner side second lug groove 321 is inclined with respect to the tire width direction, and opens to the left and right sides of the circumferential main grooves 21, 22. Also, the first inner side second sipe 323 and the second inner side second sipe 324 meander in an S-shape and open to corresponding circumferential main grooves 21, 22 inclined in the direction opposite that of the inner side second lug groove 321. This configuration is advantageous in that the tire traction performance (snow performance) is enhanced over that of a configuration in which the lug grooves and the sipes are inclined in the same direction.

Also, in the pneumatic tire 1, the groove width d5 of the inner side second narrow groove 322 is preferably in the range 1.5 (mm)≤d5≤4.0 (mm) (see FIG. 3). In this configuration the groove width d5 of the inner side second narrow groove 322 is optimized, leading to the advantage of the tire dry performance and snow performance both being achieved. For example, if d5<1.5 (mm), discharge of snow from the inner side second narrow groove 322 will be poor and the tire snow performance will decline. Moreover, if 4.0 (mm)<d5, the block rigidity of the inner side second land portion 32 will decline and the tire dry performance (steering stability performance) will decline, so this is not preferable.

Outer Side Shoulder Land Portion

Figure 4:
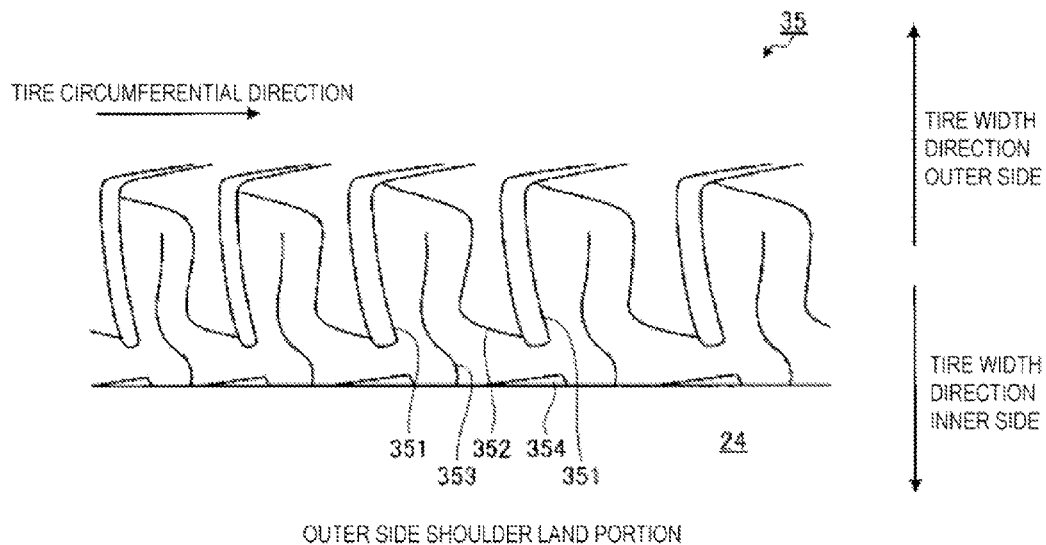
FIG. 4 is a plan view illustrating the outer side shoulder land portion of the pneumatic tire illustrated in FIG. 1.

FIG. 4 is a plan view illustrating the outer side shoulder land portion of the pneumatic tire illustrated in FIG. 1.

The outer side shoulder land portion 35 is disposed in the shoulder portion in the outer side area of the tread portion (see FIGS. 1 and 4). For example, in this embodiment, the outer side shoulder land portion 35 is the outer side area shoulder portion and is positioned to the outer side of the outer side second land portion 33 in the tire width direction, separated by the circumferential main groove 24. The outer side shoulder land portion 35 has a structure that includes a unit pattern that includes an outer side shoulder lug groove 351, an outer side shoulder sipe 352, an auxiliary sipe 353, and a recess 354, and this unit pattern is continuously disposed along the tire circumferential direction.

The outer side shoulder lug groove 351 has a semi-closed structure having one end that extends to the outer side in the width direction of the tire and is open, and another end that terminates within the land portion. Therefore, the outer side shoulder lug groove 351 is not open to the circumferential main groove 24 on the inner side in the tire width direction. For example, in this embodiment, the outer side shoulder lug groove 351 extends to the outer side in the tire width direction from the ground contact edge of the tread portion which is within the land portion, and is open to the tread edge portion, and has a non-penetrating structure.

The outer side shoulder sipe 352 is a sipe that connects the end edge of one outer side shoulder lug groove 351 of adjacent outer side shoulder lug grooves 351, 351 to the center of another outer side shoulder lug groove 351. For example, in this embodiment, the outer side shoulder sipe 352 has an S-shape or a crank shape.

The auxiliary sipe 353 is a semi-closed sipe formed between the outer side shoulder lug groove 351 and the outer side shoulder sipe 352. For example, in this embodiment, the auxiliary sipe 353 has a gentle S-shape, and extends from between the outer side shoulder lug groove 351 and the outer side shoulder sipe 352 to the inner side in the tire width direction and is open to the circumferential main groove 24.

The recess 354 is formed in the edge portion of the outer side shoulder land portion 35 on the inner side in the tire width direction. For example, in this embodiment, the recess 354 is disposed on an extended line of the outer side shoulder lug groove 351, and the edge portion of the outer side shoulder land portion 35 is chamfered so as to be wedge-shaped.

As explained above, in the pneumatic tire 1, the outer side shoulder land portion 35 includes the outer side shoulder lug groove 351 having one end that is open to the outer side in the tire width direction and another end that terminates within the land portion; and the outer side shoulder sipe 352 that connects the end edge of one outer side shoulder lug groove 351 of adjacent outer side shoulder lug grooves 351, 351 to the center of the other outer side shoulder lug groove 351 (see FIGS. 1 and 4). In this configuration, the outer side shoulder lug groove 351 has a non-penetrating structure (a structure terminating within the land portion), so rigidity of the land portion on the outer side area side, which greatly affects the tire steering stability performance (turnability), is ensured and, as a result, the tire dry performance is ensured. Additionally, the outer side shoulder sipe 352 connects adjacent outer side shoulder lug grooves 351, 351, leading to the tire traction performance (snow performance) being enhanced. Such a configuration is advantageous in that both tire dry performance and snow performance are achieved.

Also, in the pneumatic tire 1, the outer side shoulder land portion 35 has a smaller groove area than the inner side shoulder land portion 34 (see FIG. 1). In this configuration, the outer side shoulder lug groove 351 has a non-penetrating structure (a structure terminating within the land portion) and the outer side shoulder sipe 352 connects adjacent outer side shoulder lug grooves 351, 351. This is advantageous in that the tire dry performance and snow performance are both achieved. In addition, the outer side shoulder land portion 35 has a groove area smaller than that of the inner side shoulder land portion 34. Therefore, the rigidity of the outer side shoulder land portion 35, which greatly affects the tire turnability, is ensured, leading to the advantage of the tire dry performance being optimally ensured.

In particular, in the configuration that combines the central land portion 31 and the outer side shoulder land portion 35, the outer side area of the central land portion 31 has a structure that ensures the rigidity of the edge portion (semi-closed structure of notch portion 313 and second central sipe 314). Therefore, the tire forward traveling performance is ensured, and the outer side shoulder land portion 35 improves the tire turnability, leading to the tire dry performance being enhanced. Also, the outer side shoulder lug groove 351 of the outer side shoulder land portion 35 has a non-penetrating structure, so the tire turnability is ensured. Additionally, the central land portion 31 (in particular the inner side area) and the outer side shoulder land portion 35 have grooves and sipes, leading to the tire traction performance being enhanced. This leads to the advantage of both the tire dry performance and snow performance being optimally ensured.

In addition, in the configuration that combines the central land portion 31, the inner side second land portion 32, and the outer side shoulder land portion 35, synergy thereof leads to the advantages of both the tire dry performance and snow performance being further achieved.

Also, in the pneumatic tire 1, the auxiliary sipe 353 is between the outer side shoulder lug groove 351 and the outer side shoulder sipe 352 (see FIG. 4). In this configuration, the outer side shoulder land portion 35 reduces the land portion rigidity in the portion between the outer side shoulder lug groove 351 and the outer side shoulder sipe 352, leading to the advantage of the tire traction performance being enhanced.

Also, in the pneumatic tire 1, the outer side shoulder land portion 35 has the recess 354 in the edge portion on the inner side in the tire width direction (see FIGS. 1 and 4). In this configuration, the recess 354 reduces the rigidity of the outer side shoulder land portion 35, leading to the advantage of the tire traction performance being enhanced.

Outer Side Second Land Portion

Figure 5:
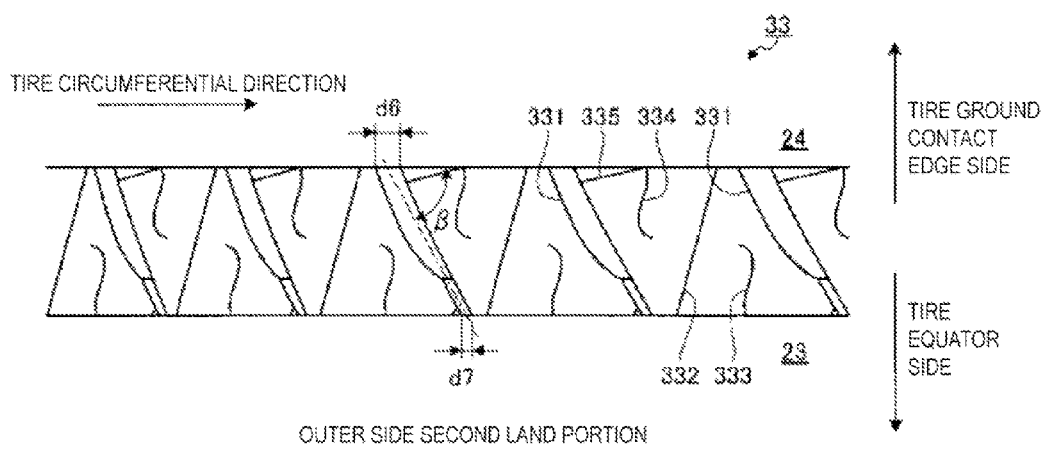
FIG. 5 is a plan view illustrating the outer side second land portion of the pneumatic tire illustrated in FIG. 1.

FIG. 5 is a plan view illustrating the outer side second land portion of the pneumatic tire illustrated in FIG. 1.

The outer side second land portion 33 is disposed in the outer side area side of the tread portion with respect to the central land portion 31. For example, in this embodiment, the central land portion 31 and the outer side second land portion 33 are adjacent to each other and sandwich the circumferential main groove 23. The outer side second land portion 33 has a structure that includes a unit pattern that includes an outer side second lug groove 331, an outer side second sipe 332, a pair of auxiliary sipes 333, 334, and a chamfered portion 335, and this unit pattern is disposed continuously in the tire circumferential direction.

The outer side second lug groove 331 crosses the outer side second land portion 33 in the tire width direction, and is open to the circumferential main grooves 23, 24 on the left and right sides of the outer side second land portion 33. In the outer side second lug groove 331, the opening width d6 with respect to the circumferential main groove 24 on the tire ground contact edge side is greater than the opening width d7 with respect to the circumferential main groove 23 on the tire equator CL side (d6>d7). For example, in this embodiment, the outer side second lug groove 331 has either a linear shape or a gentle arc shape, and is disposed with an inclination with respect to the tire circumferential direction with a predetermined angle of inclination β. Also, the outer side second lug groove 331 has a shape in which the groove width widens step-like at the center of the outer side second land portion 33. Also, the groove depth of the portion with the wide opening width d6 is set to be greater than the groove depth of the portion with the narrow opening width d7. Therefore, a difference in rigidity is provided between the left and right sides of the land portion.

The outer side second sipe 332 is an open sipe that connects the circumferential main groove 23 on the tire equator CL side and the circumferential main groove 24 on the tire ground contact edge side. For example, in this embodiment, the outer side second sipe 332 has a linear shape, and crosses the outer side second land portion 33 in the tire width direction inclined in a direction opposite that of the outer side second lug groove 331 (forming an upside-down "V" shape).

The pair of auxiliary sipes 333, 334 are semi-closed sipes formed between the outer side second lug groove 331 and the outer side second sipe 332. For example, in this embodiment, the auxiliary sipe 333 (334) has a gently curved shape, and extends from between the outer side second lug groove 331 and the outer side second sipe 332 to the tire equator CL side (tire ground contact edge side) and is open to the circumferential main groove 23 (24).

The chamfered portion 335 is formed at a confluence of the outer side second lug groove 331 and the circumferential main groove 24 on the tire ground contact edge side. For example, in this embodiment, the chamfered portion 335 has the shape wherein the edge portion of the outer side second land portion 33 has been chamfered.

As described above, in the pneumatic tire 1, the outer side second land portion 33 includes the outer side second lug groove 331 that crosses the outer side second land portion 33 at an inclination with respect to the tire circumferential direction, and has an opening width d6 with respect to the circumferential main groove 24 on the tire ground contact edge side that is greater than an opening width d7 with respect to the circumferential main groove 23 on the tire equator CL side; and the outer side second sipe 332 that crosses the outer side second land portion 33 at an inclination in a direction opposite that of the outer side second lug groove 331 (see FIGS. 1 and 5). In this configuration, the outer side second land portion 33 includes the outer side second lug groove 331 and the outer side second sipe 332. Therefore, the tire traction performance is enhanced. Also, the outer side second lug groove 331 and the outer side second sipe 332 are inclined in opposite directions. Therefore, the tire traction performance is further enhanced. Moreover, in the outer side second lug groove 331, the opening width d6 with respect to the circumferential main groove 24 on the tire ground contact edge side is larger than the opening width d7 with respect to the circumferential main groove 23 on the tire equator CL side. Therefore, the rigidity of the edge portion on the tire ground contact edge side, which has a great effect on the tire forward traveling performance, is increased, and the tire dry performance is ensured. Also, in the configuration described above, the outer side second sipe 332 is not a narrow groove but instead is a sipe. Therefore, the rigidity of the outer side second land portion 33 is ensured, and the tire dry performance is ensured. Such configurations are advantageous in that both tire dry performance and snow performance are achieved.

Also, in the pneumatic tire 1, the opening width d6 of the outer side second lug groove 331 with respect to the circumferential main groove 24 on the tire ground contact edge side and the opening width d7 with respect to the circumferential main groove 23 on the tire equator CL side preferably have the relationship $1.5 \leq d6/d7 \leq 2.0$ (see FIG. 5). In this configuration, the ratio d6/d7 of the opening widths d6, d7 on the left and right sides of the outer side second lug groove 331 is optimized. Therefore, the rigidity of the edge portion on the tire ground contact edge side (the outer side in the vehicle width direction when the tire is mounted on the vehicle) is effectively increased, leading to the advantage of the tire dry performance (steering stability performance) being ensured.

Also, in the pneumatic tire 1, the angle of inclination β of the outer side second lug groove 331 with respect to the tire circumferential direction is preferably in the range 55 (deg) $\leq \beta \leq$ 75 (deg) (see FIG. 5). In this configuration, the angle of inclination β of the outer side second lug groove 331 is optimized, leading to the advantage of the tire traction performance and noise performance being ensured. For example, if β<55 (deg), the rigidity of the outer side second land portion will increase, and it will not be possible to ensure the traction performance, so this is not desirable. Also, if 75 (deg)<β, pattern noise will increase and the tire noise performance will decrease, so this is not desirable.

The angle of inclination β of the outer side second lug groove 331 is measured using a straight line that connects the center points of each of the openings of the outer side second lug groove 331 as a line of reference.

Also, in the pneumatic tire 1, the chamfered portion 335 is formed at the confluence of the outer side second lug groove 331 and the circumferential main groove 24 on the tire ground contact edge side (see FIG. 5). In this configuration, the presence of the chamfered portion 335 leads to the advantage of uneven wear being suppressed at the confluence of the outer side second lug groove 331 and the circumferential main groove 24 on the tire ground contact edge side.

Inner Side Shoulder Land Portion

Figure 6:
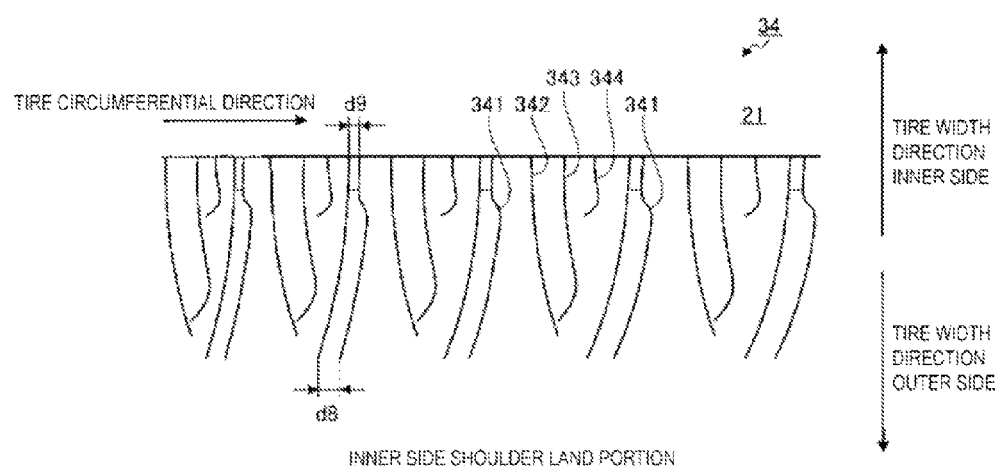
FIG. 6 is a plan view illustrating the inner side shoulder land portion of the pneumatic tire illustrated in FIG. 1.

FIG. 6 is a plan view illustrating the inner side shoulder land portion of the pneumatic tire illustrated in FIG. 1.

The inner side shoulder land portion 34 is disposed in the shoulder portion in the inner side area of the tread portion (see FIGS. 1 and 6). For example, in this embodiment, the inner side shoulder land portion 34 is disposed in the shoulder portion of the inner side area, adjacent to the inner side second land portion 32, separated by the circumferential main groove 21. The inner side shoulder land portion 34 has a structure that includes a unit pattern that includes an inner side shoulder lug groove 341, and a plurality of auxiliary sipes 342 through 344, and this unit pattern is continuously disposed along the tire circumferential direction.

The inner side shoulder lug groove 341 is a lug groove that crosses the inner side shoulder land portion 34 in the tire width direction. In the inner side shoulder lug groove 341, an opening width d8 on the outer side in the tire width direction is greater than an opening width d9 with respect to the circumferential main groove 21 on the inner side in the tire width direction (d8>d9). For example, in this embodiment, the inner side shoulder lug groove 341 has either a linear shape or a gentle arc shape, and is disposed with a gentle inclination with respect to the tire width direction. Also, the inner side shoulder lug groove 341 has the shape in which the groove width widens step-like within the inner side shoulder land portion 34. Also, the groove depth of the portion with the wide opening width d8 is set to be greater than the groove depth of the portion with the narrow opening width d9. Therefore, a difference in rigidity is provided between the left and right sides of the land portion.

The auxiliary sipes 342 through 344 are semi-closed sipes disposed between adjacent inner side shoulder lug grooves 341, 341, having one end that is open to the circumferential main groove 21 on the inner side in the tire width direction, and another end that terminates within the land portion. For example, in this embodiment, three auxiliary sipes 342 through 344 with different lengths are disposed between adjacent inner side shoulder lug grooves 341, 341. Also, these auxiliary sipes 342 through 344 do not intersect each other, but only connect with the circumferential main groove 21 on the inner side in the tire width direction. By providing the auxiliary sipes 342 through 344 in this way, the decline in the rigidity of the land portion is limited.

As described above, in the pneumatic tire 1, the inner side shoulder land portion 34 includes the inner side shoulder lug groove 341 that crosses the inner side shoulder land portion 34 and has the opening width d8 on the outer side in the tire width direction greater than the opening width d9 with respect to the circumferential main groove 21 on the inner side in the tire width direction; and auxiliary sipes 342 through 344 disposed between adjacent inner side shoulder lug grooves 341 having one end that is connected to the circumferential main groove 21 on the inner side in the tire width direction and the other end that terminates within the land portion (see FIGS. 1 and 6). In this configuration, the inner side shoulder land portion 34 includes the inner side shoulder lug groove 341 and the auxiliary sipes 342 through 344, leading to the advantage of the tire traction performance being enhanced. Additionally, the relationship between the opening widths d8 and d9 on the left and right sides of the inner side shoulder lug groove 341 is set so that the opening width narrows on the inner side in the tire width direction, leading to the advantage of the tire noise performance being ensured.

Tire Curvature Radius

Figure 7:
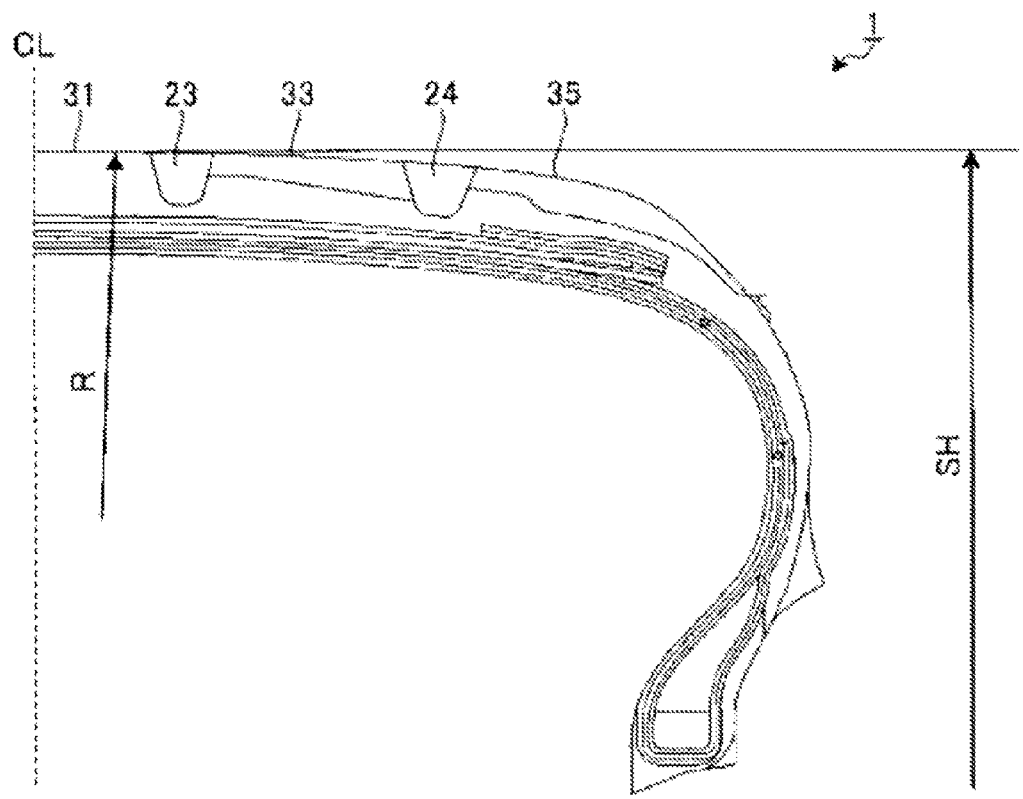
FIG. 7 is a cross sectional view in a tire meridian direction of the pneumatic tire illustrated in FIG. 1.
Figure 8:
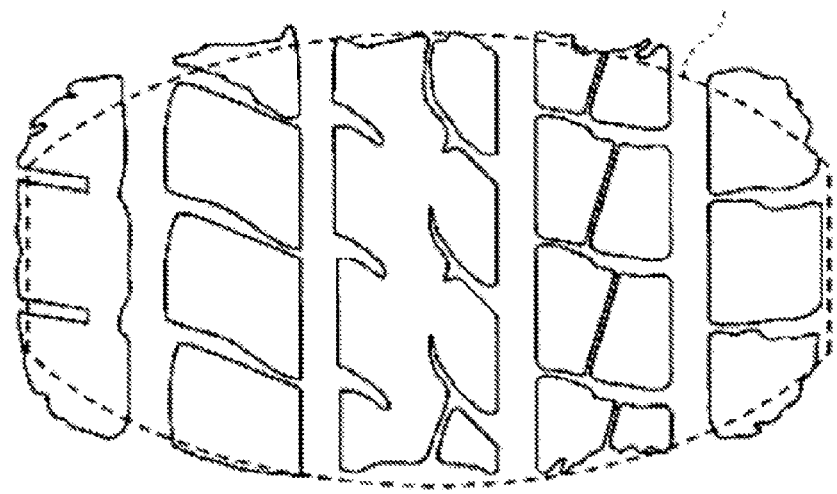
FIG. 8 is a plan view illustrating the ground contact shape of a working example of the pneumatic tire illustrated in FIG. 1.
Figure 9:
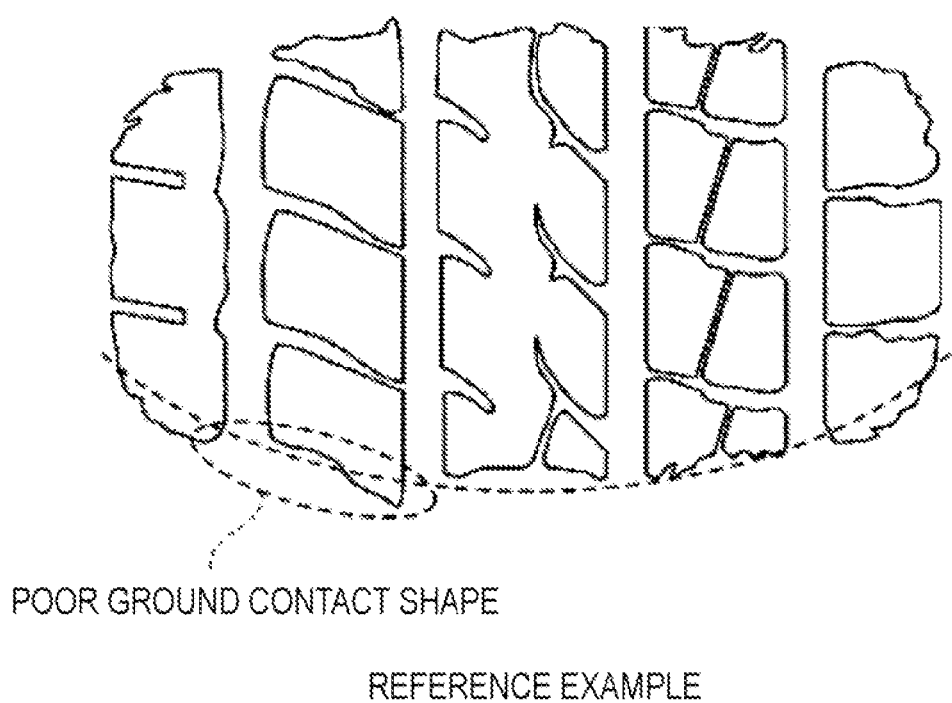
FIG. 9 is a plan view illustrating the ground contact shape of a reference example of the pneumatic tire illustrated in FIG. 1.

FIG. 7 is a cross sectional view in a tire meridian direction of the pneumatic tire shown in FIG. 1. FIGS. 8 and 9 are plan views illustrating the ground contact shape of the pneumatic tire illustrated in FIG. 1. In these drawings, FIG. 8 illustrates the ground contact shape for a Working Example in which the tire curvature radius is optimized, and FIG. 9 illustrates the ground contact shape for a tire according to a Reference Example.

In the pneumatic tire 1, in an inflated state, the curvature radius R of the tire tread portion and the external tire diameter SH preferably have the relationship $1.5 \leq R/SH \leq 1.7$ (see FIG. 7). Here, "inflated state" refers to a condition in which the tire is assembled on the prescribed rim, the prescribed internal pressure is applied to the tire, and no load is applied.

The ground contact shape is affected not only by the relationship between the curvature radius R and the external tire diameter SH, but also by the tread pattern and the internal shape of the tire. Here, in the pneumatic tire 1 illustrated in FIG. 1, a case where the relationship between the curvature radius R and the external tire diameter SH has been optimized is illustrated.

In the pneumatic tire 1, by optimizing the ratio R/SH of the curvature radius R of the tire tread portion to the external tire diameter SH at the time of inflation, the ground contact shape is optimized. Thus, high frequency pattern noise generated when the tire is rotating is suppressed, leading to the advantage of the tire noise performance being enhanced. For example, if $R/SH<1.5$, the ground contact shape becomes extended in the tire circumferential direction giving a shape that is long longitudinally, and if $1.7<R/SH$, the ground contact shape becomes extended in the tire width direction giving a flat shape (see FIG. 9). In these cases, the ground contact shape is unsatisfactory, so they are not desirable.

Performance Tests

In this embodiment, performance tests for (1) dry performance, (2) snow performance, (3) vehicle external noise performance, and (4) vehicle internal noise performance were performed for a plurality of pneumatic tires under different conditions (see FIG. 10). In these performance tests, pneumatic tires with a tire size P225/45/R19 92V were assembled on rims of a rim size 19×8.5 J, inflated to an internal pressure of 240 (kPa) and loaded with a load of 4 (kN). Also, the pneumatic tires were fitted to a FR drive test vehicle having an engine displacement of 3,700 (cc).

(1) In the performance tests for dry performance, the test vehicle on which the pneumatic tires were mounted was driven at a speed of from 60 km/h to 100 km/h on a flat, dry, circuit test course. Then the test driver performed a sensory evaluation regarding steering while lane changing and cornering and stability while traveling forward. In this evaluation, the index value of the pneumatic tire of the Conventional Example was set as the standard score (100), and higher scores were preferable.

(2) In the performance tests for snow performance, the test vehicle on which the pneumatic tires were mounted was driven at a speed of 40 km/h on a snowy road surface in a snow road testing facility, and the test driver performed a sensory evaluation. In this evaluation, the index value of the pneumatic tire of the Conventional Example was set as the standard score (100), and higher scores were preferable.

In the performance tests for (3) vehicle external noise performance (road noise) and (4) vehicle internal noise performance (pattern noise), the test vehicle on which the pneumatic tires were mounted was coasted on an ISO test road, and the sound pressure levels were measured. Then, evaluation was carried out with the conventional pneumatic tire (Conventional Example) as the standard (100). In the evaluation results larger numbers indicate lower sound pressure levels, which are more preferable. A precondition of the evaluation in (3) vehicle external noise performance and (4) vehicle internal noise performance was a passing score for the (1) dry performance and (2) snow performance tests (an evaluation of 100 or higher). Evaluations of 103 or higher were considered to be within the allowable range.

The pneumatic tires of Working Examples 1 through 12 were the pneumatic tire illustrated in FIG. 1. Specifically, the central land portion 31 included the central narrow groove 311 and the first central sipe 312 located in the inner side area, and the notch portion 313 and the second central sipe 314 located in the outer side area (see FIGS. 1 and 2). Also, the inner side second land portion 32 included the inner side second lug groove 321, the inner side second narrow groove 322, the first inner side second sipe 323, and the second inner side second sipe 324 (see FIG. 3). Also, the outer side shoulder land portion 35 included the outer side shoulder lug groove 351, and the plurality of outer side shoulder sipes 352 through 354 (see FIG. 4). Also, the outer side second land portion 33 included the outer side second lug groove 331 and the outer side second sipe 332 (see FIG. 5). Also, the inner side shoulder land portion 34 included the inner side shoulder lug groove 341 and the plurality of auxiliary sipes 342 through 344 (see FIG. 6).

The pneumatic tire of the Conventional Example was the pneumatic tire described in Japanese Unexamined Patent Application Publication No. 2010-58781A (not shown on the drawings). Specifically, the central land portion included a central narrow groove located on the inner side area and a notch located on the outer side area. However, sipes corresponding to the first central sipe 312 and the second central sipe 314 in Working Example 1 were not provided. Also, the inner side second land portion included an inner side second lug groove with a constant groove width (d3/d4) and a narrow groove with a semi-closed structure parallel to the inner side second lug groove. However, narrow grooves or sipes corresponding to the inner side second narrow groove 322, the first inner side second sipe 323, and the second inner side second sipe 324 in Working Example 1 were not provided. Also, the outer side shoulder land portion included an outer side shoulder lug groove. However, sipes corresponding to the plurality of outer side shoulder sipes 352 through 354 in Working Example 1 were not provided.

As can be seen from the test results, with the pneumatic tires 1 of Working Examples 1 through 12, the tire dry performance and snow performance were both achieved, and at least one of these displayed an enhancement over the Conventional Example (see FIG. 10).

Also, comparing Working Examples 1 through 3, it is clear that by optimizing the opening width d1 of the central narrow groove 311 and the opening width d2 of the notch portion 313, the tire dry performance and snow performance were optimally ensured.

Also, comparing Working Examples 1, 4, and 5, it is clear that by optimizing the angle of inclination α of the notch portion 313 with respect to the tire circumferential direction, the tire dry performance and snow performance were optimally ensured.

Also, comparing Working Example 1 and Working Example 6, it is clear that by optimizing the opening width ratio d3/d4 of the inner side second lug groove 321 and the opening width ratio d6/d7 of the outer side second lug groove 331, the tire dry performance and snow performance were optimally ensured.

Also, comparing Working Examples 1, 7, and 8, it is clear that by optimizing the groove width d5 of the inner side second narrow groove 322, the tire dry performance and snow performance were optimally ensured.

Also, comparing Working Examples 1, 9, and 10, it is clear that by optimizing the angle of inclination β of the outer side second lug groove 331 with respect to the tire circumferential direction, the tire dry performance and snow performance were optimally ensured. Also, it is clear that the tire noise performance has been maintained within the allowable range.

Also, comparing Working Examples 1, 11, and 12, it is clear that by optimizing the ratio R/SH of the curvature radius R of the tire tread portion to the external tire diameter SH, the tire dry performance and snow performance were optimally ensured. Also, it is clear that the tire noise performance has been maintained within the allowable range.

As described above, the pneumatic tire according to the present technology is useful for achieving both tire dry performance and tire snow performance.

What is claimed is:

1. A pneumatic tire comprising a plurality of circumferential main grooves extending in a tire circumferential direction and a plurality of land portions formed by being partitioned by the circumferential main grooves comprising, when areas on left and right sides of the tread portion, with a tire equator as a boundary, are referred to as an inner side area and an outer side area respectively:

a central land portion located on the tire equator including a central narrow groove and a first central sipe located in the inner side area, and a notch portion and a second central sipe located in the outer side area, wherein the central narrow groove has an arc shape, an inner diameter side of the arc shape faces towards a tire ground contact edge side, one end of the central narrow groove is open to another adjacent central narrow groove, and another end thereof is open to the circumferential main groove on an inner side area side;

the first central sipe is disposed between the adjacent central narrow grooves and connects the central narrow groove and the circumferential main groove on the inner side area side;

the first central sipe extends from the center of the central narrow groove in an extending direction of the arc shape of the central narrow groove and reaches to the circumferential main groove on the inner side area side;

one end of the notch portion is open to the circumferential main groove on an outer side area side and another end thereof terminates within the central land portion; and the second central sipe is disposed between adjacent notch portions, one end of the second central sipe is connected to the circumferential main groove on the outer side area side and another end thereof terminates within the central land portion.

2. The pneumatic tire according to claim 1, wherein an opening width d1 of the central narrow groove with respect to the circumferential main groove is within a range 3 (mm) ≤d1≤8 (mm), and a groove width of the central narrow groove decreases from the opening with respect to the circumferential main groove towards a connection portion with the adjacent central narrow groove.

3. The pneumatic tire according to claim 1, wherein an opening width d2 of the notch portion with respect to the circumferential main groove is within a range 3 (mm)≤d2≤8 (mm).

4. The pneumatic tire according to claim 1, wherein an angle of inclination a of the notch portion with respect to the tire circumferential direction is within a range 50 (deg)≤α≤75 (deg).

5. The pneumatic tire according to claim 1, further comprising an inner side second land portion on the inner side area side of the central land portion, wherein the inner side second land portion comprises:
   an inner side second lug groove that crosses the inner side second land portion and has an opening width with respect to the circumferential main groove on the tire ground contact edge side that is larger than an opening width with respect to the circumferential main groove on the tire equator side;
   an inner side second narrow groove that connects adjacent inner side second lug grooves;
   a first inner side second sipe that connects the inner side second narrow groove and the circumferential main groove on the tire ground contact edge side; and
   a second inner side second sipe that connects the inner side second narrow groove and the circumferential main groove on the tire equator side.

6. The pneumatic tire according to claim 5, wherein an opening width d3 of the inner side second lug groove with respect to the circumferential main groove on the tire ground contact edge side and an opening width d4 with respect to the circumferential main groove on the tire equator side have a relationship 1.5≤d3/d4≤2.0.

7. The pneumatic tire according to claim 1, further comprising an outer side shoulder land portion disposed in a shoulder portion of the outer side area, wherein
   the outer side shoulder land portion comprises an outer side shoulder lug groove having one end that is open to the outer side in a tire width direction and another end that terminates within the land portion; and an outer side shoulder sipe that connects the terminating portion of one outer side shoulder lug groove of adjacent outer side shoulder lug grooves to a center of another outer side shoulder lug groove.

8. The pneumatic tire according to claim 7, wherein the outer side shoulder land portion has a recess in an edge portion on the inner side in the tire width direction.

9. The pneumatic tire according to claim 1, further comprising an outer side second land portion disposed in the outer side area, and adjacent to the central land portion, wherein the outer side second land portion comprises:
   an outer side second lug groove that crosses the outer side second land portion while inclined with respect to the tire circumferential direction and has an opening width on the tire ground contact edge side that is larger than an opening width on the tire equator side; and
   an outer side second sipe that crosses the outer side second land portion while inclined in a direction opposite that of the outer side second lug groove.

10. The pneumatic tire according to claim 9, wherein an opening width d6 of the outer side second lug groove with respect to the circumferential main groove on the tire ground contact edge side and an opening width d7 with respect to the circumferential main groove on the tire equator side have a relationship 1.5≤d6/d7≤2.0.

11. The pneumatic tire according to claim 9, wherein an angle of inclination β of the outer side second lug groove with respect to the tire circumferential direction is within a range 55 (deg)≤β≤75 (deg).

12. The pneumatic tire according to claim 1, further comprising an inner side shoulder land portion disposed in a shoulder portion of the inner side area, wherein the inner side shoulder land portion comprises:
   an inner side shoulder lug groove that crosses the inner side shoulder land portion and has an opening width on the outer side in the tire width direction that is larger than an opening width on the inner side in the tire width direction; and
   an auxiliary sipe disposed between adjacent inner side shoulder lug grooves and that connects to the circumferential main groove on the inner side in the tire width direction.

13. The pneumatic tire according to claim 1, wherein a curvature radius R of a tire tread portion and an external tire diameter SH when inflated have a relationship 1.5≤R/SH≤1.7.

14. The pneumatic tire according to claim 1, further comprising an inner side second land portion on the inner side area side of the central land portion, wherein the inner side second land portion includes
   inner side second lug grooves that cross the inner side second land portion and have opening widths with respect to the circumferential main groove on the tire ground contact edge side that are larger than opening widths with respect to the circumferential main groove on the tire equator side;
   inner side second narrow grooves that connect adjacent inner side second lug grooves; and
   the adjacent inner side second narrow grooves are open at different positions with respect to a common inner side second lug groove.

15. The pneumatic tire according to claim 1, further comprising an inner side shoulder land portion disposed in a shoulder portion of the inner side area, wherein the inner side shoulder land portion comprises an inner side shoulder lug groove that crosses the inner side shoulder land portion and has an opening width on the outer side in the tire width direction that is larger than an opening width on the inner side in the tire width direction; wherein the inner side shoulder lug groove has an arc shape and is disposed with an inclination with respect to the tire width direction.

16. The pneumatic tire according to claim 1, further comprising an inner side shoulder land portion disposed in a shoulder portion of the inner side area, wherein the inner side shoulder land portion comprises an inner side shoulder lug groove that crosses the inner side shoulder land portion and has an opening width on the outer side in the tire width direction that is larger than an opening width on the inner side in the tire width direction; wherein the inner side shoulder lug groove has a shape in which an inner side shoulder lug groove width widens step-like within the inner side shoulder land portion.

17. The pneumatic tire according to claim 16, wherein an inner side shoulder lug groove depth of a portion of the inner side shoulder lug groove with a wide opening width is set to be greater than an inner side shoulder lug groove depth of a portion of the inner side shoulder lug groove with a narrow opening width.

18. The pneumatic tire according to claim 1, wherein the first central sipe has an S-shape.

19. The pneumatic tire according to claim 1, wherein the second central sipe reaches the circumferential main groove while inclined with respect to the tire circumferential direction in the opposite direction to the notch portion.

20. The pneumatic tire according to claim 1, further comprising an inner side second land portion on the inner side area side of the central land portion, wherein the inner side second land portion comprises:
- an inner side second lug groove that crosses the inner side second land portion and has an opening width with respect to the circumferential main groove on the tire ground contact edge side that is larger than an opening width with respect to the circumferential main groove on the tire equator side;
- an inner side second narrow groove that connects adjacent inner side second lug grooves;
- a first inner side second sipe that connects the inner side second narrow groove and the circumferential main groove on the tire ground contact edge side;
- a second inner side second sipe that connects the inner side second narrow groove and the circumferential main groove on the tire equator side; and
- the first inner side second sipe and the second inner side second sipe reaches the circumferential main grooves inclined in the opposite direction with respect to the inner side second lug groove.

21. The pneumatic tire according to claim 1, further comprising an inner side second land portion on the inner side area side of the central land portion, wherein the inner side second land portion comprises:
- an inner side second lug groove that crosses the inner side second land portion and has an opening width with respect to the circumferential main groove on the tire ground contact edge side that is larger than an opening width with respect to the circumferential main groove on the tire equator side;
- an inner side second narrow groove that connects adjacent inner side second lug grooves;
- a first inner side second sipe that connects the inner side second narrow groove and the circumferential main groove on the tire ground contact edge side;
- a second inner side second sipe that connects the inner side second narrow groove and the circumferential main groove on the tire equator side; and
- the adjacent inner side second narrow grooves are open at different positions with respect to the common inner side second lug groove.

* * * * *